United States Patent
Kai et al.

(10) Patent No.: US 12,205,785 B2
(45) Date of Patent: Jan. 21, 2025

(54) SWITCHGEAR AND POWER CONVERTER

(71) Applicant: Mitsubishi Electric Corporation, Tokyo (JP)

(72) Inventors: Takayuki Kai, Tokyo (JP); Toshihiko Takematsu, Tokyo (JP); Ryo Kamimae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 17/915,102

(22) PCT Filed: Apr. 14, 2020

(86) PCT No.: PCT/JP2020/016389
§ 371 (c)(1),
(2) Date: Sep. 28, 2022

(87) PCT Pub. No.: WO2021/210058
PCT Pub. Date: Oct. 21, 2021

(65) Prior Publication Data
US 2023/0154708 A1    May 18, 2023

(51) Int. Cl.
*H01H 33/666* (2006.01)
*H01H 39/00* (2006.01)
*H02M 1/32* (2007.01)

(52) U.S. Cl.
CPC ........ *H01H 39/004* (2013.01); *H01H 33/666* (2013.01); *H02M 1/325* (2021.05); *H01H 2239/044* (2013.01)

(58) Field of Classification Search
CPC .. H01H 39/004; H01H 39/002; H01H 39/006; H01H 2239/044; H01H 33/666;
(Continued)

(56) References Cited

U.S. PATENT DOCUMENTS

| | | | |
|---|---|---|---|
| 6,667,863 B1 * | 12/2003 | Mallonen | H01H 9/36 361/13 |
| 9,953,779 B2 * | 4/2018 | Jung | H01H 39/004 |

(Continued)

FOREIGN PATENT DOCUMENTS

| | | |
|---|---|---|
| JP | 2007-507837 A | 3/2007 |
| JP | 2011-510440 A | 3/2011 |

(Continued)

OTHER PUBLICATIONS

International Search Report and Written Opinion mailed on Jul. 14, 2020, received for PCT Application PCT/JP2020/016389, filed on Apr. 14, 2020, 8 pages including English Translation.

*Primary Examiner* — William A Bolton
(74) *Attorney, Agent, or Firm* — XSENSUS LLP (57) ABSTRACT

An object of the present disclosure is to provide a switchgear that reduces a cost of periodic replacement of a drive unit and ensures reliability. A switchgear of the present disclosure includes a fixed electrode, a movable electrode provided to face the fixed electrode, the movable electrode being contactable with and separable from the fixed electrode, a piston provided opposite to the fixed electrode to drive the movable electrode via a movable shaft connected to the movable electrode, a container to accommodate the piston, and an arc generation mechanism bridging including metal and provided in the container at a position opposite to the fixed electrode, the arc generation mechanism bridging a terminal unit connected to an external circuit, the arc generation mechanism bridging opening a circuit with the terminal unit when energized to generate an arc at an opened portion.

11 Claims, 11 Drawing Sheets

(58) Field of Classification Search
CPC .......... H01H 79/00; H01H 3/24; H01H 35/38;
H01H 85/0026; H01H 85/003; H01H
85/0039; H01H 85/04; H01H 85/0411;
H01H 2085/0414; H02M 1/325
USPC ............ 218/1, 95, 93, 90, 85, 96; 200/48 R,
200/61.08, 243, 254
See application file for complete search history.

(56) References Cited

U.S. PATENT DOCUMENTS

| | | | |
|---|---|---|---|
| 10,211,014 B2* | 2/2019 | Kim | H01H 85/0241 |
| 10,236,148 B2* | 3/2019 | Lell | H01H 3/28 |
| 10,593,496 B2* | 3/2020 | Numata | H02H 9/041 |
| 2007/0102269 A1 | 5/2007 | Hartmann | |
| 2010/0133080 A1* | 6/2010 | Jeong | H01H 79/00 |
| | | | 200/402 |
| 2011/0057762 A1 | 3/2011 | Burger et al. | |
| 2016/0203929 A1 | 7/2016 | Jung | |
| 2017/0236663 A1 | 8/2017 | Jung | |
| 2019/0108957 A1* | 4/2019 | Volkmann | H01H 39/006 |
| 2019/0393008 A1* | 12/2019 | Lopez | H01H 39/004 |

FOREIGN PATENT DOCUMENTS

| | | |
|---|---|---|
| JP | 2016-131142 A | 7/2016 |
| JP | 2017-147216 A | 8/2017 |

* cited by examiner

SWITCHGEAR AND POWER CONVERTER

CROSS-REFERENCE TO RELATED APPLICATION

The present application is based on PCT filing PCT/JP2020/016389, filed Apr. 14, 2020, the entire contents of which is incorporated herein by reference.

TECHNICAL FIELD

The present disclosure relates to a switchgear for a power device and to a power converter using the switchgear.

BACKGROUND ART

In recent years, in a self-commutated converter used for high voltage direct current (HVDC) or static synchronous compensator (STATCOM) as a DC power transmission system, a modular multilevel converter (MMC) has been introduced. The MMC converter is configured by connecting submodules, which are small converters, in series in multiple stages. Redundancy can be achieved in units of submodules, and submodules can be easily replaced even at a time of failure.

In the MMC converter, each submodule is provided with a switchgear that short-circuits an output terminal of the failed submodule in order to continuously operate even when some submodules are failed. The switchgear needs to operate at a high speed in order to suppress an influence of the failure accompanied by an arc generation in the submodule. There is a switchgear including a drive unit that operates using a blasting technique in an event of failure (see, for example, PTL 1).

CITATION LIST

Patent Literature

PTL 1: National Patent Publication No. 2011-510440

SUMMARY OF INVENTION

Technical Problem

However, since such a conventional blasting technique uses a drive unit utilizing gunpowder, the drive unit provided in the switchgear needs to be periodically replaced in order to ensure reliability, and there is a possibility that cost is generated at the time of replacement.

The present disclosure has been made to solve the above problem, and an object of the present disclosure is to provide a switchgear that reduces a cost of periodic replacement of a drive unit and ensures reliability.

Solution to Problem

A switchgear of the present disclosure includes a fixed electrode, a movable electrode provided to face the fixed electrode, the movable electrode being contactable with and separable from the fixed electrode, a piston provided opposite to the fixed electrode to drive the movable electrode via a movable shaft connected to the movable electrode, a container to accommodate the piston, and an arc generation mechanism including metal and provided in the container at a position opposite to the fixed electrode, the arc generation mechanism bridging a terminal unit connected to an external circuit, the arc generation mechanism opening a circuit with the terminal unit When energized to generate an arc at the opened portion.

Advantageous Effects of Invention

The switchgear according to the present disclosure does not require periodic replacement of the drive unit, and can ensure reliability.

DESCRIPTION OF EMBODIMENTS

First Embodiment

Figure 1:
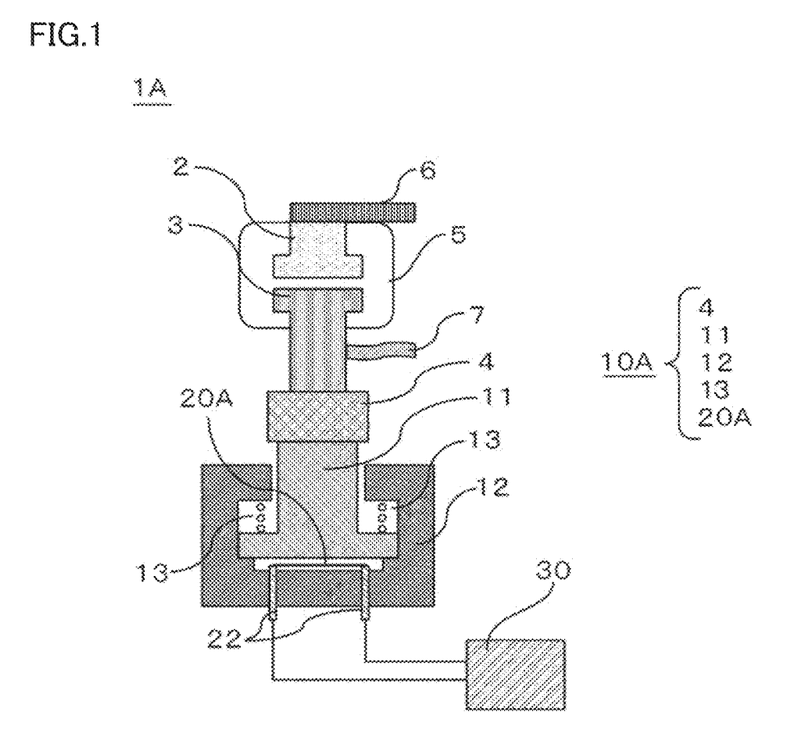
FIG. 1 is an example of a sectional view of a switchgear according to a first embodiment.

FIG. 1 is an example of a sectional view of a switchgear 1A according to the present embodiment. Switchgear 1A will be described with reference to FIG. 1.

As illustrated in FIG. 1, switchgear 1A includes a fixed electrode 2, a movable electrode 3, a vacuum container 5, an upper terminal 6, a lower terminal 7, a drive unit 10A, an arc generation mechanism 20A, and a terminal unit 22. Terminal unit 22 is connected to a drive power supply 30, and is, for example, a power supply terminal.

Drive unit 10A includes a movable shaft 4 and a container 12, and container 12 accommodates a piston 11, an opening spring 13, and metal arc generation mechanism 20A. Container 12 is desirably insulating.

Movable electrode 3 is provided so as to face fixed electrode 2, and is contactable with and separable from fixed electrode 2.

Movable electrode 3 is connected to movable shaft 4. Movable shaft 4 is desirably insulating.

A contact point at which fixed electrode 2 and movable electrode 3 contact with each other is accommodated in vacuum container 5.

Piston 11 is provided opposite to fixed electrode 2, and drives movable electrode 3 via movable shaft 4. Piston 11 slides along container 12.

Arc generation mechanism 20A is provided in container 12 opposite to fixed electrode 2, and bridges terminal unit 22. Terminal unit 22 is connected to drive power supply 30 which is an external circuit, and arc generation mechanism 20A, terminal unit 22, and drive power supply 30 constitute a circuit.

When energized, arc generation mechanism 20A opens a circuit with terminal unit 22 to generate an arc at an opened portion. Due to a pressure of the generated arc, piston 11 operates in a direction to close movable electrode 3.

A movable part operated by the pressure of the arc is movable electrode 3, movable shaft 4, and piston 11. A fixed part of switchgear 1A is other than the movable part.

In the present embodiment, arc generation mechanism 20A is a fuse.

Figure 2:
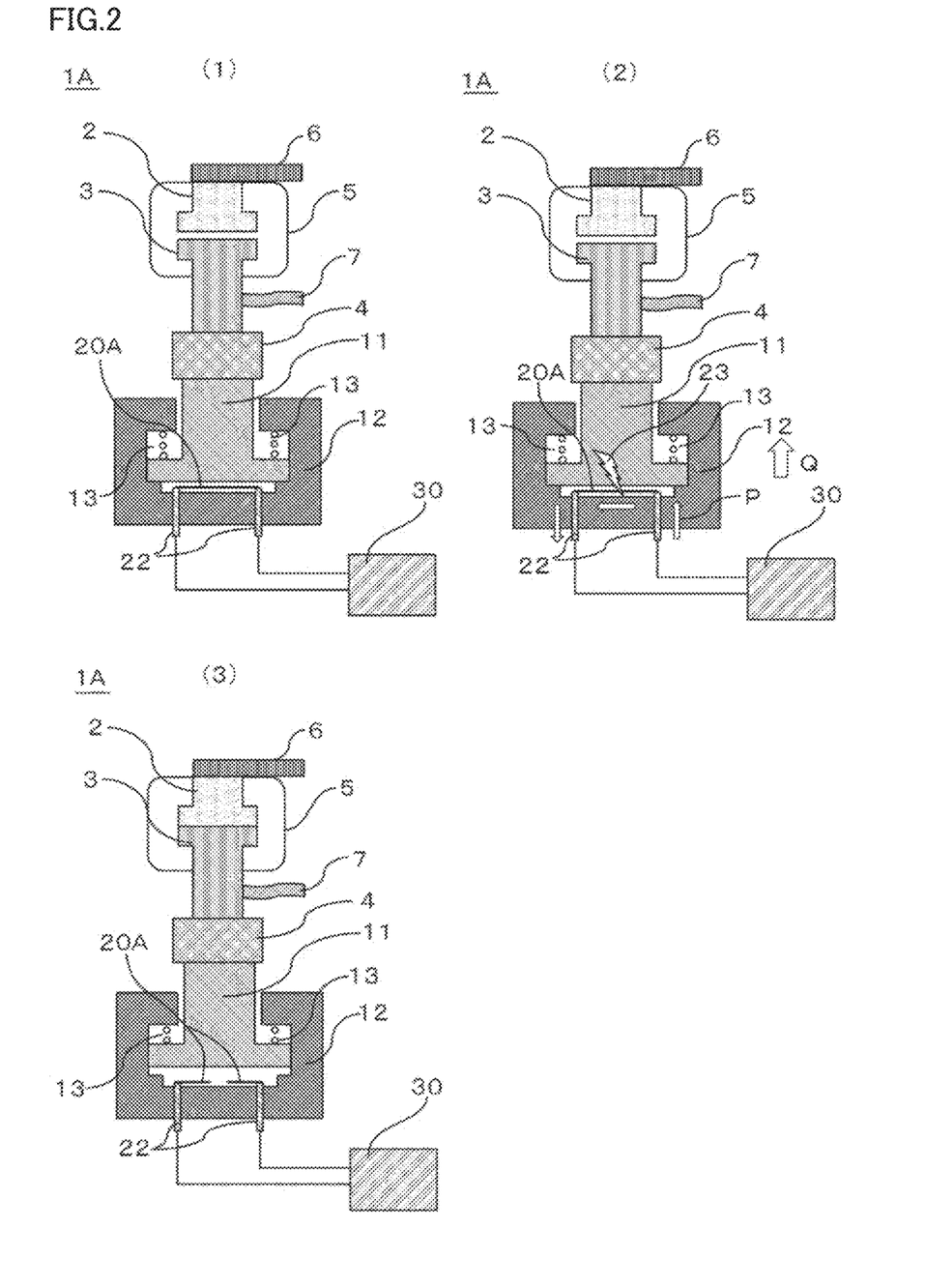
FIG. 2 is a diagram illustrating a flow of a closing operation of the switchgear according to the first embodiment.

FIG. 2 is a diagram illustrating a flow of a closing operation of switchgear 1A according to the present embodiment. FIG. 2(1) illustrates an open state which is a position in an initial state, FIG. 2(2) illustrates a driving state in a midway of operation of arc generation mechanism 20A, and FIG. 2(3) illustrates a closed state after operation of arc generation mechanism 20A.

In the open state, which is the position in the initial state in FIG. 2(1), piston 11 is positioned in a space on an open side in container 12. Arc generation mechanism 20A bridges contact terminal unit 22. In the open state, opening spring 13, which is an elastic member, is connected to and held by the movable part. As another example of the holding in the open state, the movable part may be sucked and held on the open side by a weight of the movable part, a permanent magnet, or an electromagnet. Otherwise, in a state of an initial position, an outer wall accommodating switchgear 1A or a component connecting the fixed part and the movable part may be provided, and the component may be released or destroyed during the operation of arc generation mechanism 20A.

An arrow P in FIG. 2(2) indicates an energization path in a case where drive power supply 30 energizes arc generation mechanism 20A. An arrow Q indicates a direction in which the movable part moves by a pressure in container 12.

When energization is performed, as indicated by arrow P, a current flows from drive power supply 30 to arc generation mechanism 20A via terminal unit 22, and thus, arc generation mechanism 20A is immediately burned out, the circuit with terminal unit 22 is opened, and an arc 23 is generated at the opened portion. When arc 23 is generated in container 12, a temperature of air in container 12 rapidly rises and the pressure in container 12 rises. As a result, piston 11 receives the pressure, operates to rise in a direction of Q, which is a closing direction of movable electrode 3, and drives movable electrode 3 in the closing direction via movable shaft 4.

In the closed state in FIG. 2(3), an energization path is formed by upper terminal 6, fixed electrode 2, movable electrode 3, and lower terminal 7 after closing.

When energized, an electromagnetic repulsive force is generated between fixed electrode 2 and movable electrode 3, and it is therefore necessary to pressurize the contact point between fixed electrode 2 and movable electrode 3. In a pressure contact method, for example, an elastic member may be provided inside movable shaft 4, and the elastic member may be connected to each of movable electrode 3 and movable shaft 4 to pressurize movable electrode 3 and movable shaft 4, or a pressure that can adjust and hold a decreasing pressure in piston 11 may be used.

Similarly to the holding in the open state, the holding in the closed state is performed by connecting an elastic member that generates a load in the closing direction to the movable part. As an example of the elastic member, movable shaft 4 and the outer wall accommodating switchgear 1A are connected and held by a disk spring. As another example of the holding in the closed state, the movable part may be sucked and held on the closed side by a weight of the movable part, a permanent magnet, or an electromagnet. Otherwise, a component that connects the movable part and the outer wall accommodating switchgear 1A may be provided and held at a position of the closed state.

In the present disclosure, by receiving pressure generated as a result of a rapid rise in the temperature in container 12 due to arc 23 generated by burning out of arc generation mechanism 20A provided in switchgear 1A, movable electrode 3 can move in the closing direction to close switchgear 1A. Thus, since an explosion technology is not used, the components do not need to be periodically replaced, and it is possible to obtain switchgear 1A with long-term high reliability.

In addition, switchgear 1A can be operated at a high speed by utilizing a rapid increase in pressure in container 12 due to arc 23.

In a case where gunpowder or other media is used for driving piston 11, the gunpowder or other media needs to be managed so as not to explode. However, in the present embodiment, it is sufficient to provide arc generation mechanism 20A that bridges terminal unit 22, and therefore, assembling work of switchgear 1A is simple.

Drive power supply 30 to be energized to generate an arc is desirably a direct current that is unlikely to be naturally extinguished.

Since drive power supply 30 discharges a pulse current at once when the pulse current includes a capacitor charge and discharge circuit, switchgear 1A can be operated at even higher speed.

In a case where drive power supply 30 is a capacitor discharge circuit, when electric charge of the capacitor disappears at the time of operation, arc 23 in arc generation mechanism 20A is naturally extinguished.

By meandering in container 12, the fuse used in arc generation mechanism 20A according to the present embodiment can be expected to have an effect of increasing a length of generated arc 23 and increasing a pressure rise.

In the present embodiment, switchgear 1A that performs the closing operation has been described with reference to FIG. 2, but an opposite driving direction may be used for a switchgear that requires a high-speed opening operation.

Second Embodiment

A difference between the first embodiment and a second embodiment is a difference in the arc generation mechanism. Although the fuse is used in the arc generation mechanism according to the first embodiment, a switch is used in the arc generation mechanism according to the second embodiment.

Hereinafter, only the difference between the first embodiment and the second embodiment will be described, and description of the same or corresponding parts will be omitted. As for the reference signs, the same or corresponding parts as those in the first embodiment are denoted by the same reference signs, and the description thereof will be omitted.

Figure 3:
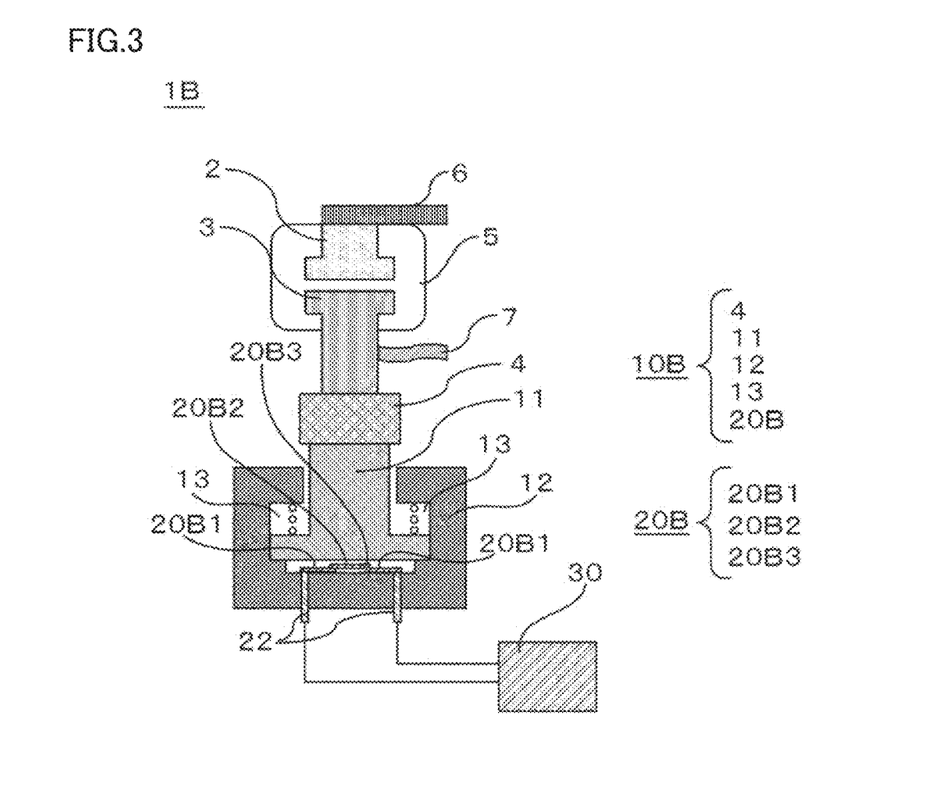
FIG. 3 is an example of a sectional view of a switchgear according to a second embodiment.

FIG. 3 is an example of a sectional view of a switchgear 1B according to the present embodiment. Switchgear 1B will be described with reference to FIG. 3.

A drive unit 10B includes movable shaft 4 and container 12, and container 12 accommodates piston 11, opening spring 13, and an arc generation mechanism 20B.

In the present embodiment, arc generation mechanism 20B is a switch. Arc generation mechanism 20B includes a fixed conductor 20B1, a movable conductor 20B2, and a contact 20B3. One end of movable conductor 20B2 is contactable with and separable from one fixed conductor 20B1 at a contact point. The other end of movable conductor 20B2 is connected to the other fixed conductor 20B1 by contact 20B3, and can perform separation and contact operation with a contact point via contact 20B3. Movable conductor 20B2 may be a plate instead of movable conductor 20B2 or a flexible conductor having flexibility may be used without using contact 20B3 as long as being connected to one fixed conductor 20B1 and being contactable with and separable from the other fixed conductor 20B1. Fixed conductor 20B1 is provided by bridging terminal unit 22 in container 12, and arc generation mechanism 20B, terminal unit 22, and drive power supply 30 constitute a circuit.

When energized, arc generation mechanism 20B separates movable conductor 20B2 from the contact point with fixed conductor 20B1 by the electromagnetic repulsive force, and generates an arc at the opened portion by mechanically opening the circuit with terminal unit 22. Due to a pressure of the generated arc, piston 11 operates in a direction to close movable electrode 3.

Figure 4:
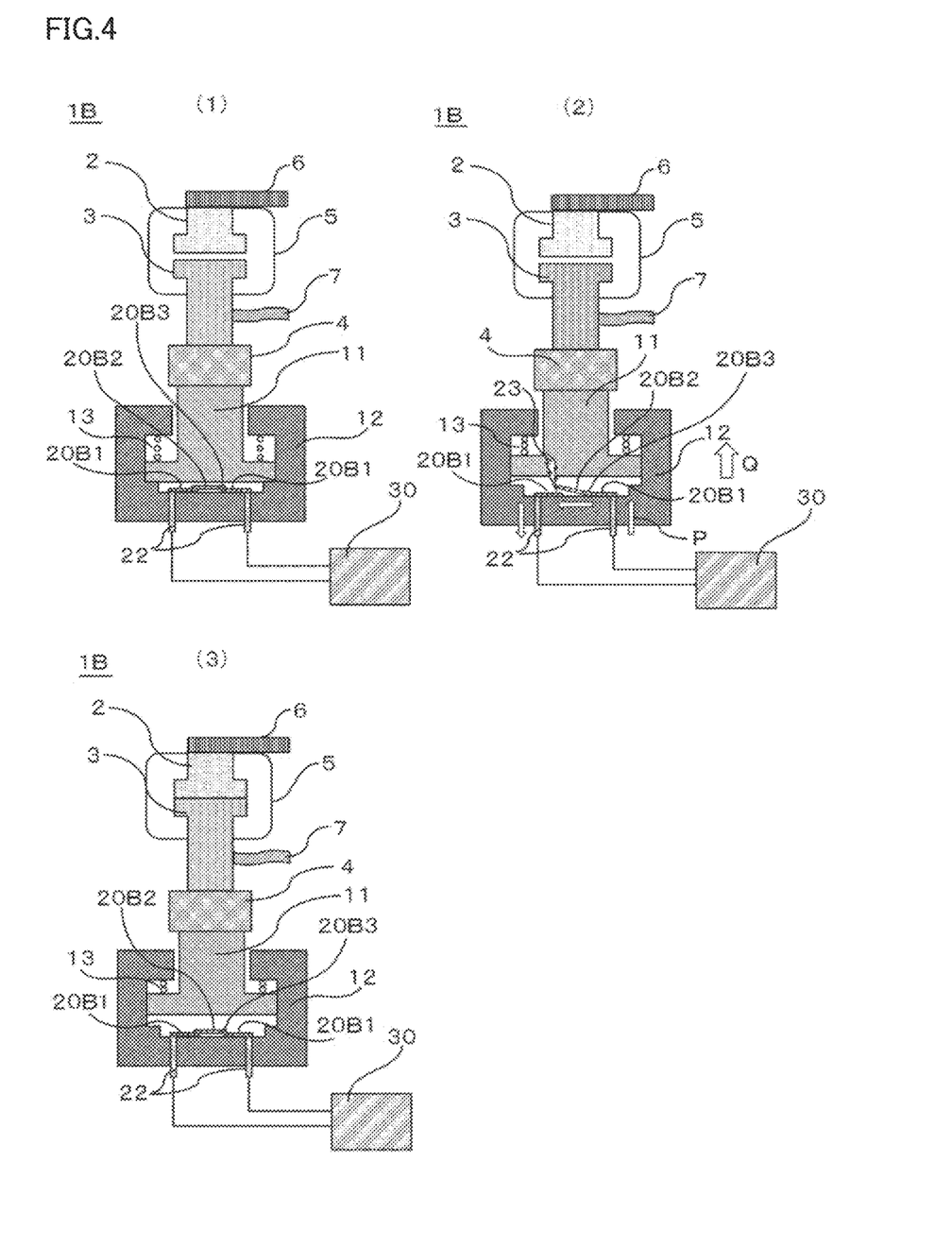
FIG. 4 is a diagram illustrating a flow of a closing operation of the switchgear according to the second embodiment.

FIG. 4 is a diagram illustrating a flow of a closing operation of switchgear 1B according to the present embodiment. FIG. 4(1) illustrates an open state which is a position in an initial state, FIG. 4(2) illustrates a driving state in a midway of operation of arc generation mechanism 20B, and FIG. 4(3) illustrates a closed state after operation of arc generation mechanism 20B.

In the open state, which is the position in the initial state in FIG. 4(1), piston 11 is disposed in contact with container 12. As in the first embodiment, in the open state in the present embodiment, opening spring 13, which is an elastic member that generates a load in an opening direction, is connected to and held by the movable part. Fixed conductor 20B1 and movable conductor 20B2 of arc generation mechanism 20B are in contact with each other at the contact point.

An arrow P in FIG. 4(2) indicates an energisation path in a case where drive power supply 30 energizes arc generation mechanism 20B. An arrow Q indicates a direction in which the movable part moves by a pressure in container 12.

When energized, as indicated by arrow P, the current flows from drive power supply 30 to arc generation mechanism 20B via terminal unit 22, and thus, in arc generation mechanism 20B, an electromagnetic repulsive force is generated at the contact point between fixed conductor 20B1 and movable conductor 20B2. Movable conductor 20B2 is separated from fixed conductor 20B1 by the generated electromagnetic repulsive force. A contact pressure load of arc generation mechanism 20B is set in advance such that movable conductor 20B2 separates from fixed conductor 20B1. When movable conductor 20B2 separates from fixed conductor 20B1, a circuit with terminal unit 22 is opened, and arc 23 is generated at the contact point between fixed conductor 20B1 and movable conductor 20B2 bridging terminal unit 22.

The pressure by gas heated and expanded by arc 23 increases an operating speed of piston 11 in a direction of arrow Q.

As a result, piston 11 receives the pressure, operates to rise in the closing direction of movable electrode 3, and drives movable electrode 3 in the closing direction via movable shaft 4.

In the closed state in FIG. 4(3), as in the first embodiment, an energisation path is formed by upper terminal 6, fixed electrode 2, movable electrode 3, and lower terminal 7 after closing. When energized, an electromagnetic repulsive force is generated between fixed electrode 2 and movable electrode 3, and thus as in the first embodiment, the contact point between fixed electrode 2 and movable electrode 3 is pressurized to maintain the closed state.

In the present disclosure, as in the first embodiment, by using the pressure rise of arc 23 generated by the electromagnetic repulsive force of arc generation mechanism 20B provided in switchgear 1B, movable electrode 3 can move in the closing direction to close switchgear 1B.

Thus, since an explosion technology is not used, the components do not need to be periodically replaced, and it is possible to obtain switchgear 1B with long-term high reliability.

In addition, switchgear 1B can be operated at a high speed by utilizing a rapid increase in pressure in container 12 due to arc 23.

Since arc generation mechanism 20A is a fuse in the first embodiment, the fuse is blown during operation, and thus the fuse needs to be replaced once the operation is performed.

On the other hand, arc generation mechanism 20B which is a switch in the present embodiment allows the operation to be performed a plurality of times. It is therefore possible to check the operation in advance or periodically, and switchgear 1B is more reliable.

As in the first embodiment, in a case where gunpowder or other media is used for driving piston 11, the gunpowder or other media needs to be managed so as not to explode, for example. However, in the present embodiment, it is sufficient to provide arc generation mechanism 20B that bridges terminal unit 22, and therefore, assembling work of switchgear 1B is simple.

In the present embodiment, switchgear 1B that performs the closing operation has been described with reference to FIG. 4, but an opposite driving direction may be used for a switchgear that requires a high-speed opening operation.

Third Embodiment

A difference between the first and second embodiments and a third embodiment is a difference in the arc generation mechanism.

The arc generation mechanism according to the third embodiment uses a conductor.

Hereinafter, only the difference from the first and second embodiments will be described, and description of the same or corresponding parts will be omitted. As for the reference signs, the same or corresponding parts as those in the first and second embodiments are denoted by the same reference signs, and the description thereof will be omitted.

Figure 5:
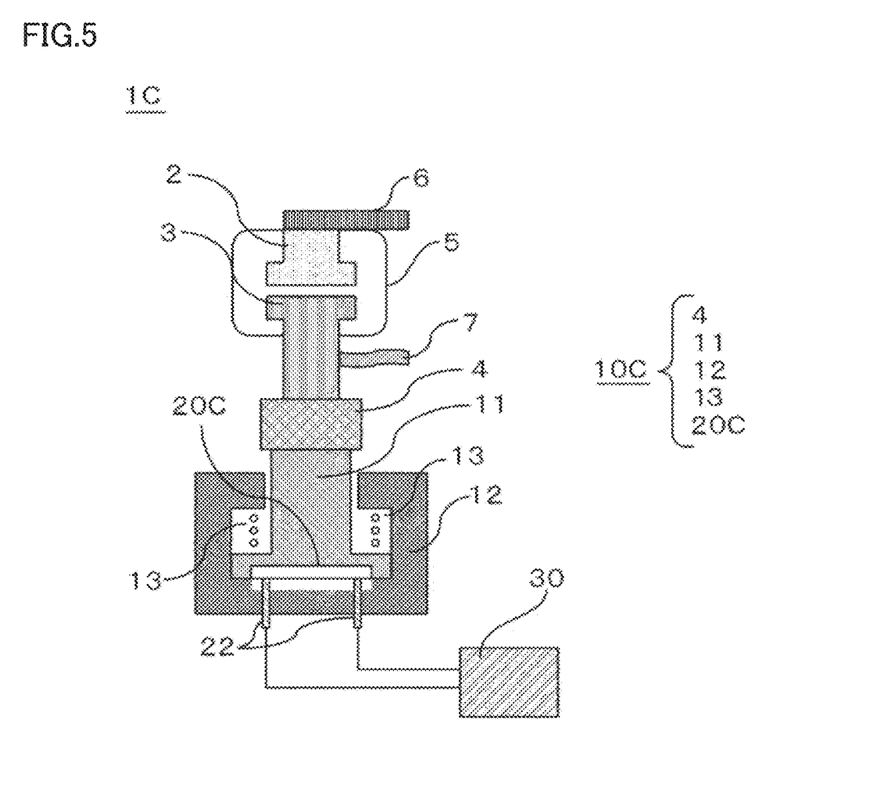
FIG. 5 is an example of a sectional view of a switchgear according to a third embodiment.

FIG. 5 is an example of a sectional view of a switchgear 1C according to the present embodiment. Switchgear 1C will be described with reference to FIG. 5.

A drive unit 10C includes movable shaft 4 and container 12, and container 12 accommodates piston 11, opening spring 13, and an arc generation mechanism 20C.

In the present embodiment, arc generation mechanism 20 C is the conductor described as movable conductor 20B2 according to the second embodiment. In the second embodiment, movable conductor 20B2 is connected to fixed conductor 20B1 to be a switch. Arc generation mechanism 20C according to the present embodiment is provided inside piston 11, and disposed on an inner side of a pressure receiving surface in piston 11 facing terminal unit 22 so as to bridge terminal unit 22. Arc generation mechanism 20C is contactable with and separable from terminal unit 22.

Arc generation mechanism 20C is connected to drive power supply 30 via terminal unit 22, and arc generation mechanism 20C, terminal unit 22, and drive power supply 30 constitute a circuit.

Figure 6:
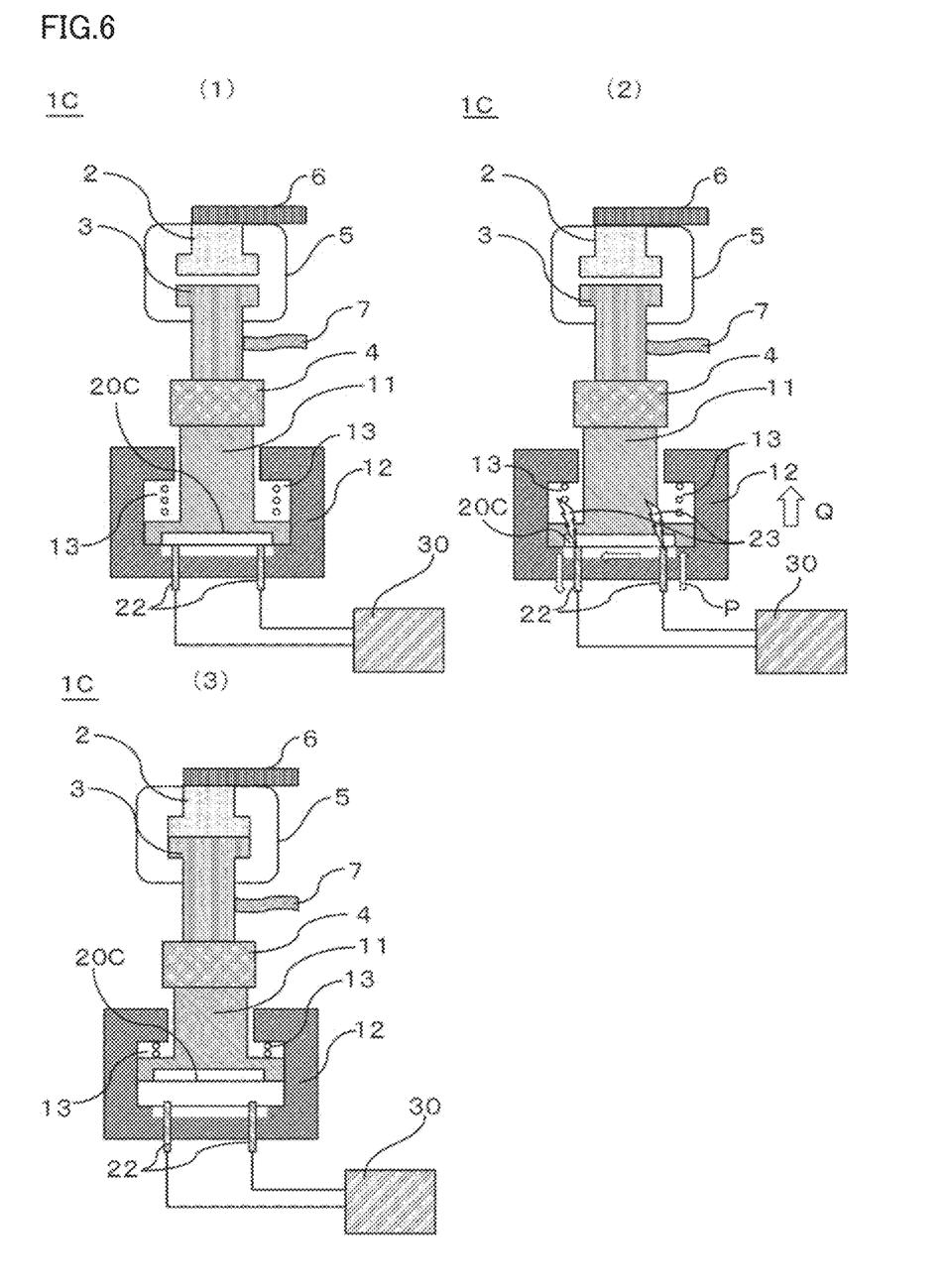
FIG. 6 is a diagram illustrating a flow of a closing operation of the switchgear according to the third embodiment.

FIG. 6 is a diagram illustrating a flow of a closing operation of switchgear 1C according to the present embodiment. FIG. 6(1) illustrates an open state which is a position in an initial state, FIG. 6(2) illustrates a driving state in a midway of operation of arc generation mechanism 20C, and FIG. 6(3) illustrates a closed state after operation of arc generation mechanism 20C.

In the open state, which is the position in the initial state in FIG. 6(1), piston 11 is positioned to be contact with container 12. Terminal unit 22 is in contact with and bridged with arc generation mechanism 20C. As in the first and second embodiments, in the open state in the present embodiment, opening spring 13 which is an elastic member is connected to and held by the movable part.

An arrow P in FIG. 6(2) indicates an energization path in a case where drive power supply 30 energizes arc generation mechanism 20C. An arrow Q indicates a direction in which the movable part moves by a pressure in container 12.

When energized, as indicated by arrow P, a current flows from drive power supply 30 to arc generation mechanism 20C via terminal unit 22, and thus, in arc generation mechanism 20C, an electromagnetic repulsive force is generated by an interaction with a current flowing through terminal unit 22. The generated electromagnetic repulsive force is a force in the direction of arrow Q which is the closing direction. Due to the generated electromagnetic repulsive force, arc generation mechanism 20C is separated from terminal unit 22 to open a circuit with terminal unit 22, and arc 23 is generated between terminal unit 22 and arc generation mechanism 20C. As illustrated in FIG. 6(2), arc 23 is generated at two opened portions where arc generation mechanism 20C bridges terminal unit 22.

The pressure of generated arc 23 and an electromagnetic force increase an operating speed of piston 11 in the direction of arrow Q.

As a result, piston 11 receives the pressure, operates to rise in the closing direction of movable electrode 3, and drives movable electrode 3 in the closing direction via movable shaft 4.

In the closed state in FIG. 6(3), as in the first and second embodiments, an energization path is formed by upper terminal 6, fixed electrode 2, movable electrode 3, and lower terminal 7 after closing. When energized by the energization path, an electromagnetic repulsive force is generated between fixed electrode 2 and movable electrode 3, and thus, the contact point between fixed electrode 2 and movable electrode 3 is pressurized to maintain the closed state.

In the present disclosure, as in the first and second embodiments, gas in a space near a bottom surface of container 12 in FIGS. 5 and 6 is heated and expanded by arc 23 generated with terminal unit 22 by the electromagnetic repulsive force of arc generation mechanism 20C provided in switchgear 1C, and movable electrode 3 receives the pressure of the expanded gas and can move in the closing direction to close switchgear 1C. Thus, since an explosion technology is not used, the components do not need to be periodically replaced, and it is possible to obtain switchgear 1C with long-term high reliability.

In addition, switchgear 1C can be operated at a high speed by utilizing a rapid increase in pressure in container 12 due to arc 23.

The expanding gas does not need to be disposed at the position of the bottom surface of container 12 illustrated in FIGS. 5 and 6 but only needs to be disposed at such a position that the air can be expanded by generated arc 23.

In the present embodiment, since arcs 23 are generated at two places, the pressure of the gas heated and expanded by arcs 23 is increased more than in the first and second embodiments. Therefore, in the present embodiment, switchgear 1C can be operated at a higher speed by the electromagnetic repulsive three in the closing direction generated in arc generation mechanism 20C in addition to a driving force due to the pressure rise of arcs 23 generated at two places.

As in the first and second embodiments, in a case where gunpowder or other media is used for driving piston 11, the gunpowder or other media needs to be managed so as not to explode, for example. However, in the present embodiment, it is sufficient to provide arc generation mechanism 20C that bridges terminal unit 22, and therefore, assembling work of switchgear 1C is simple.

In the present embodiment, switchgear 1C that performs the closing operation has been described with reference to FIG. 6, but an opposite driving direction may be used for a switchgear that requires a high-speed opening operation.

In the present exemplary embodiment, arc generation mechanism 20C is provided inside piston 11. However, arc generation mechanism 20C only needs to be provided in container 12 in which piston 11 generating arc 23 can be driven. For example, arc generation mechanism C may be disposed on the pressure receiving surface facing an outside of piston 11 and a surface of piston 11 facing terminal unit 22. However, since air leaks from a gap between piston 11 and container 12, a volume of a space between terminal unit 22 and the pressure receiving surface is preferably large.

Fourth Embodiment

A difference between the first to third embodiments and a fourth embodiment is a difference in the arc generation mechanism.

The arc generation mechanism according to the fourth embodiment uses a plurality of conductors.

Hereinafter, only the difference from the first to third embodiments will be described, and description of the same or corresponding parts will be omitted. As for the reference signs, the same or corresponding parts as those in the first to third embodiments are denoted by the same reference signs, and the description thereof will be omitted.

Figure 7:
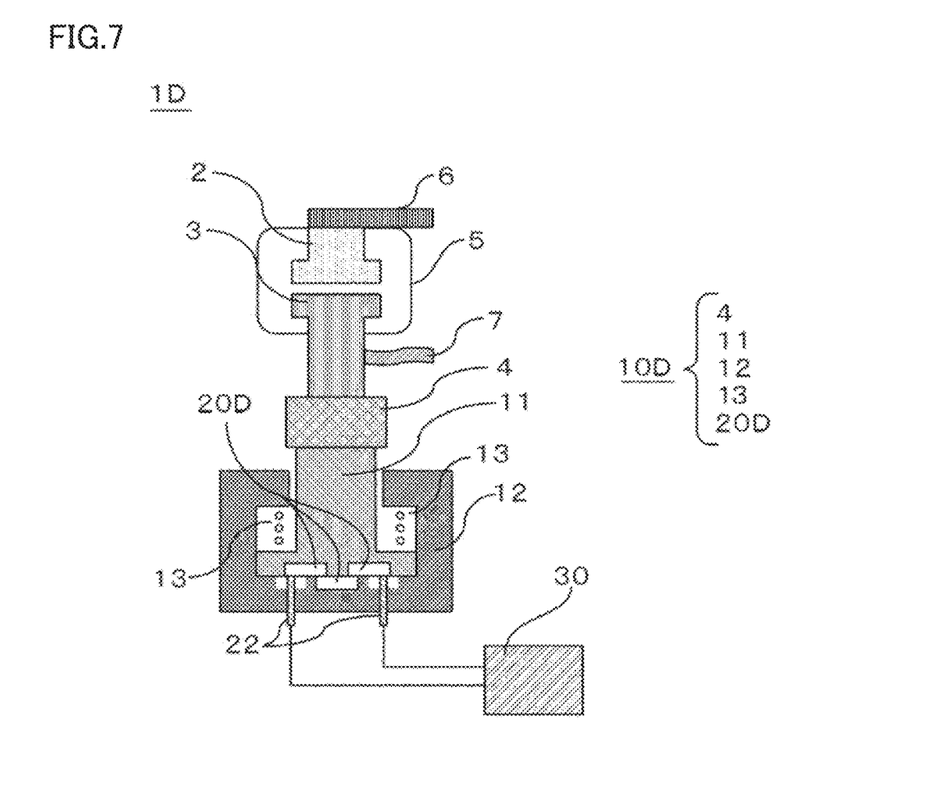
FIG. 7 is an example of a sectional view of a switchgear according to a fourth embodiment.

FIG. 7 is an example of a sectional view of a switchgear 1D according to the present embodiment. Switchgear 1D will be described with reference to FIG. 7.

A drive unit 10D includes movable shaft 4 and container 12, and container 12 accommodates piston 11, opening spring 13, and an arc generation mechanism 20D.

In the present embodiment, arc generation mechanism 20D is a plurality of conductors. In the third embodiment, the conductor is provided in the piston 11, but the conductor according to the present embodiment is also provided in container 12 in addition to piston 11. That is, arc generation mechanism 20D includes a conductor disposed on the inner side of the pressure receiving surface of piston 11 facing terminal unit 22 so as to bridge terminal unit 22, and a conductor disposed in container 12 so as to face the pressure receiving surface of piston 11. The conductor disposed in container 12 and the conductor disposed in piston 11 are provided in contact with each other so as to be connected in series. The conductor in piston 11 of arc generation mechanism 20D is contactable with and separable from terminal unit 22.

Arc generation mechanism 20D is connected to drive power supply 30 via terminal unit 22, and arc generation mechanism 20D, terminal unit 22, and drive power supply 30 constitute a circuit.

Figure 8:
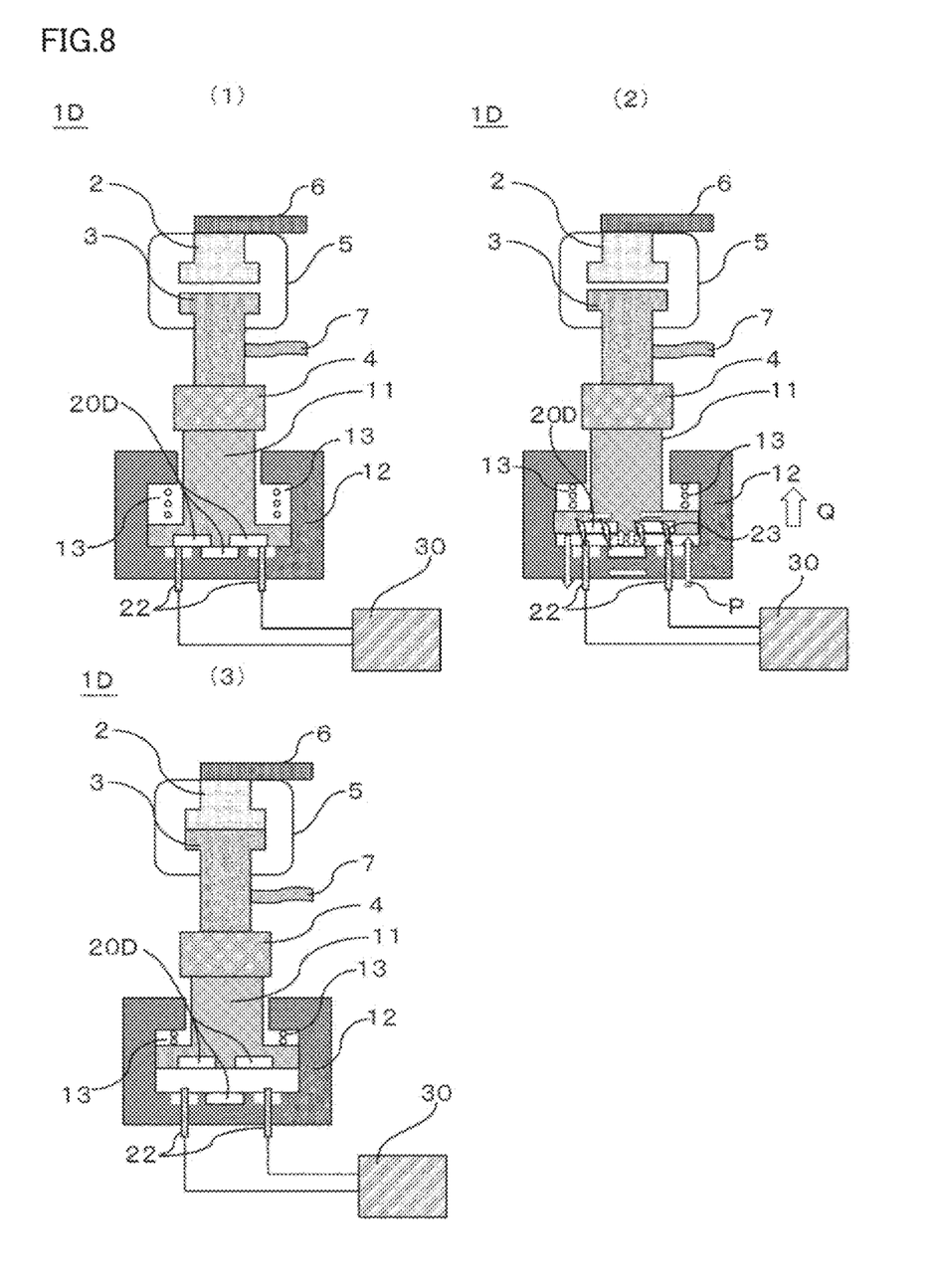
FIG. 8 is a diagram illustrating a flow of a closing operation of the switchgear according to the fourth embodiment.

FIG. 8 is a diagram illustrating a flow of a closing operation of switchgear 1D according to the present embodiment. FIG. 8(1) illustrates an open state which is a position in an initial state, FIG. 8(2) illustrates a driving state in a midway of operation of arc generation mechanism 20D, and FIG. 8(3) illustrates a closed state after operation of arc generation mechanism 20D.

In the open state, which is the position in the initial state in FIG. 8(1), piston 11 is positioned to be contact with container 12. Terminal unit 22 is in contact with and bridged with arc generation mechanism 20D. As in the first to third embodiments, in the open state in the present embodiment, opening spring 13, which is an elastic member that generates a load in the opening direction, is connected to and held by the movable part.

An arrow P in FIG. 8(2) indicates an energization path in a case where drive power supply 30 energizes arc generation mechanism 20D. An arrow Q indicates a direction in which the movable part moves by the pressure in container 12.

When energized, as indicated by arrow P, a current flows from drive power supply 30 to arc generation mechanism 20D via terminal unit 22, and thus, in arc generation mechanism 20D, an electromagnetic repulsive force is generated between the conductor in piston 11, the conductor in container 12, and terminal unit 22 by an interaction with the current flowing through terminal unit 22. The generated. electromagnetic repulsive force is a force in the direction of arrow Q which is the closing direction. Due to the generated electromagnetic repulsive three, the conductor in container 12, which is arc generation mechanism 20D, is separated from terminal unit 22 to open a circuit with terminal unit 22, and arc 23 is generated between terminal unit 22, the conductor in piston 11, and the conductor in container 12.

As illustrated in FIG. 8(2), arc is generated at four opened portions where arc generation mechanism 20D bridges terminal unit 22. The pressure of generated arc 23 and an electromagnetic force increase an operating speed of piston 11 in the direction of arrow Q. As a result, piston 11 drives movable electrode 3 in the closing direction via movable shaft 4.

In the closed state in FIG. 8(3), as in the first to third embodiments, an energization path is formed by upper terminal 6, fixed electrode 2, movable electrode 3, and lower terminal 7 after closing. When energized by the energization path, an electromagnetic repulsive force is generated between fixed electrode 2 and movable electrode 3, and thus, the contact point between fixed electrode 2 and movable electrode 3 is pressurized to maintain the closed state.

In the present disclosure, as in the first to third embodiments, the gas is heated and expanded by arc 23 generated between terminal unit 22 and arc generation mechanism 20D by the electromagnetic repulsive force of arc generation mechanism 20D provided in switchgear 1D, and movable electrode 3 receives the pressure of the heated and expanded gas and can move in the closing direction to close switchgear 1D. Thus, since an explosion technology does not need to be used, the components do not need to be periodically replaced, and it is possible to obtain switchgear 1D with long-term high reliability.

In addition, switchgear 1D can be operated at a high speed by utilizing a rapid increase in pressure in container 12 due to arc 23.

In the present embodiment, since arcs 23 are generated at four places, the pressure by arcs 23 is increased more than in the first to third embodiments. Therefore, in the present embodiment, switchgear 1D can be operated at a higher speed by the electromagnetic force in the closing direction generated in arc generation mechanism 20D in addition to a driving force due to the pressure rise of arcs 23 generated at four places.

As in the first to third embodiments, in a case where gunpowder or other media is used for driving piston 11, the gunpowder or other media needs to be managed so as not to explode, for example. However, in the present embodiment, it is sufficient to provide arc generation mechanism 20D that bridges terminal unit 22, and therefore, assembling work of switchgear 1D is simple.

In the present embodiment, switchgear 1D that performs the closing operation has been described with reference to FIG. 8, but an opposite driving direction may be used for a switchgear that requires a high-speed opening operation.

Fifth Embodiment

A difference between the first to fourth embodiments and the fifth embodiment is whether an ablation material is disposed in the switchgear.

Hereinafter, only the difference from the first and fourth embodiments will be described, and description of the same or corresponding parts will be omitted. As for the reference signs, the same or corresponding parts as those in the first to fourth embodiments are denoted by the same reference signs, and the description thereof will be omitted.

Figure 9:
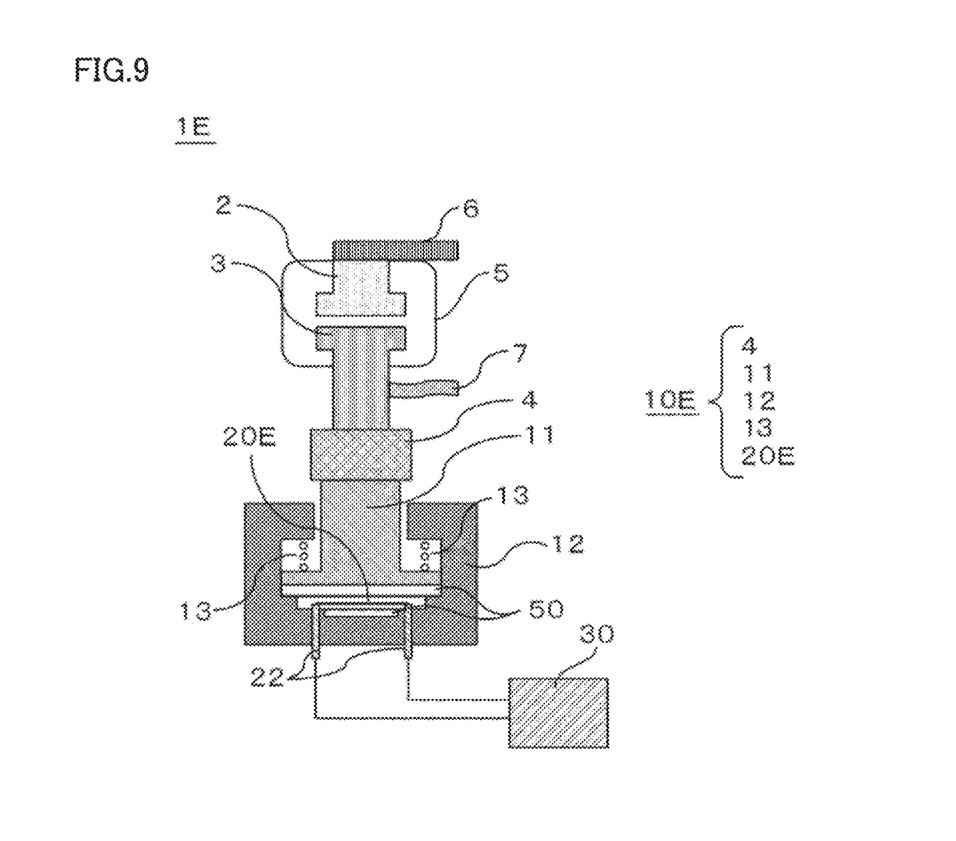
FIG. 9 is an example of a sectional view of a switchgear according to a fifth embodiment.

FIG. 9 is an example of a sectional view of a switchgear 1E according to the present embodiment. Switchgear 1E will be described with reference to FIG. 9.

A drive unit 10E includes movable shaft 4 and container 12, and container 12 accommodates piston 11, opening spring 13, and an arc generation mechanism 20E.

In the present embodiment, as in the first embodiment, arc generation mechanism 20E is a fuse and is connected to drive power supply 30 via terminal unit 22, and arc generation mechanism 20E, terminal unit 22, and drive power supply 30 constitute a circuit.

Switchgear 1E according to the present embodiment includes an ablation. material 50. Ablation material 50 is a material, such as a thermoplastic resin, which is decomposed and vaporized by light and heat of an arc. In the present embodiment, as illustrated in FIG. 9, one ablation material 50 is provided inside piston 11, and disposed on the inner side of the pressure receiving surface in piston 11 facing terminal unit 22. The other ablation material 50 is disposed in container 12 so as to face the pressure receiving surface of piston 11.

Figure 10:
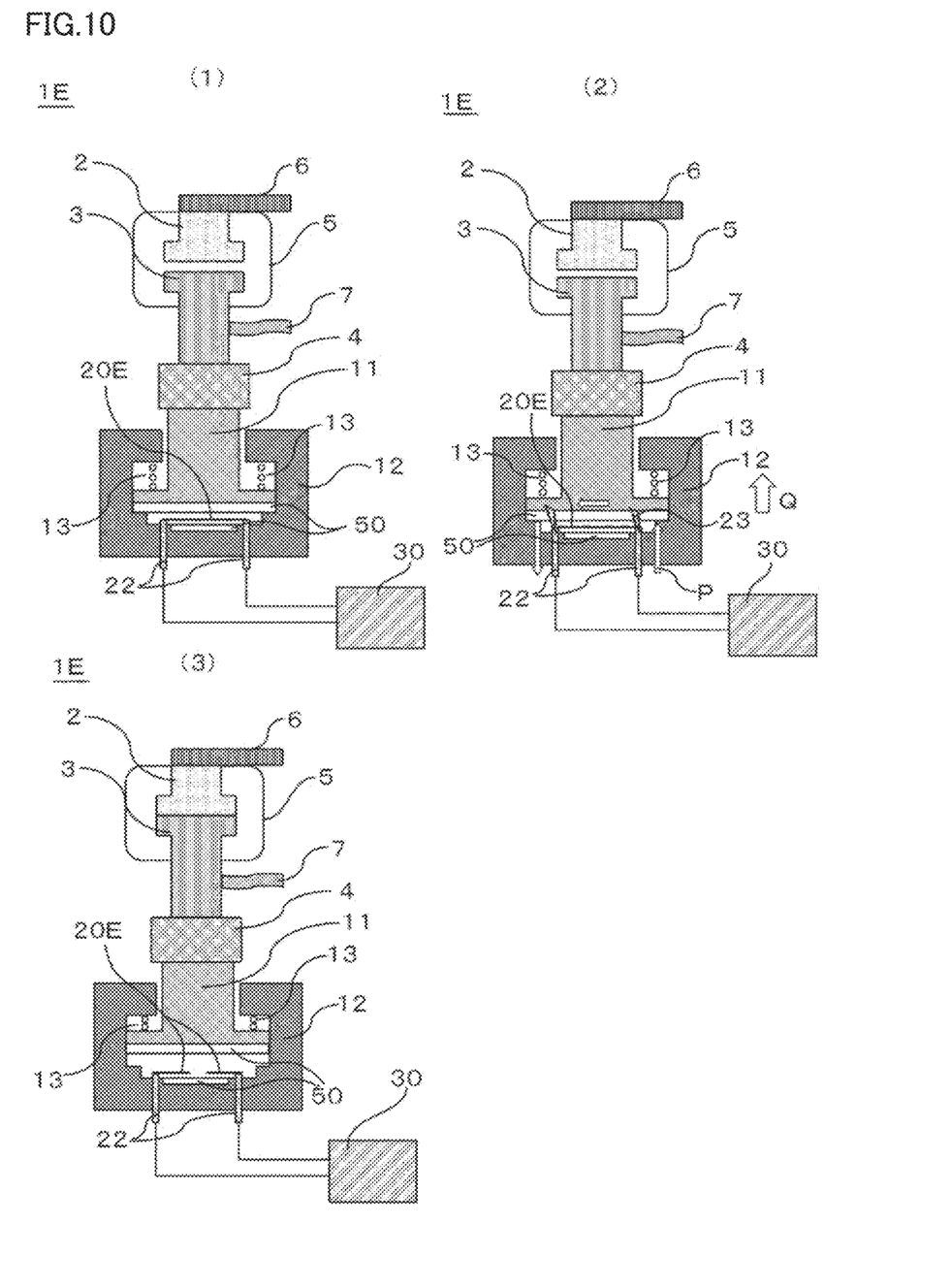
FIG. 10 is a diagram illustrating a flow of a closing operation of the switchgear according to the fifth embodiment.

FIG. 10 is a diagram illustrating a flow of a closing operation of switchgear 1E according to the present embodiment. FIG. 10(1) illustrates an open state which is a position in an initial state, FIG. 10(2) illustrates a driving state in a midway of operation of arc generation mechanism 20E, and FIG. 10(3) illustrates a closed state after operation of arc generation mechanism 20E.

In the open state, which is the position in the initial state in FIG. 10(1), piston 11 is positioned so as to be in contact with the space on the open side in container 12. Terminal unit 22 is bridged with arc generation mechanism 20E. As in the first to fourth embodiments, in the open state in the present embodiment, opening spring 13, which is an elastic member that generates a load in the opening direction, is connected to and held by the movable part.

An arrow P in FIG. 10(2) indicates an energization path in a case where drive power supply 30 energizes arc generation mechanism 20E. An arrow Q indicates a direction in which the movable part moves by the pressure in container 12.

When energization is performed, as indicated by arrow P, a current flows from drive power supply 30 to arc generation mechanism 20E via terminal unit 22, and thus, as in the first embodiment, arc generation mechanism 20E is immediately burned out, the circuit with terminal unit 22 is opened, and an arc 23 is generated at the opened portion. A surface of ablation material 50 is decomposed by arc 23 and vaporized.

In the present embodiment, in container 12, in addition to the pressure due to the gas heated and expanded by generated arc 23, the pressure due to the gas vaporized from ablation material 50 is generated.

Receiving the pressure of generated arc 23 and the pressure due to ablation material 50, piston 11 gains an increased operating speed in the direction of arrow Q. As a result, piston 11 receives the pressure, operates to rise in the closing direction of movable electrode 3, and drives movable electrode 3 in the closing direction via movable shaft 4.

In the closed state in FIG. 10(3), as in the first to fourth embodiments, an energization path is formed by upper terminal 6, fixed electrode 2, movable electrode 3, and lower terminal 7 after closing. When energized by the energization path, an electromagnetic repulsive force is generated between fixed electrode 2 and movable electrode 3, and thus as in the first embodiment, the contact point between fixed electrode 2 and movable electrode 3 is pressurized to maintain the closed state.

In the present disclosure, as in the first to fourth embodiments, due to arc 23 generated by burning out of arc generation mechanism 20E provided in switchgear 1E, the temperature in container 12 is increased. The expansion of the gas and the vaporization of ablation material 50 rapidly increase the temperature in container 12 to expand a volume. The pressure of the volume can move movable electrode 3 in the closing direction to close switchgear 1E. Thus, since an explosion technology is not used, the components do not need to be periodically replaced, and it is possible to obtain a switchgear with long-term high reliability.

In addition, the switchgear can be operated at a high speed by utilizing a rapid increase in pressure in container 12 due to arc 23.

In the present embodiment, since the pressure due to the vaporization of ablation material 50 is applied, the switchgear can be operated at a higher speed than in the first embodiment.

In the present embodiment, an ablation material is added to the fuse which is the arc generation mechanism according to the first embodiment. However, in any of the second to fourth embodiments, the ablation material can be similarly added to increase the pressure rise, and the speed can be further increased.

In the present embodiment, the ablation material is disposed in piston 11 and in container 12 facing the pressure receiving surface of piston 11, but the present invention is not limited thereto. For example, the ablation material may be disposed on a side of the pressure receiving surface of piston 11 in container 12. Ablation material 50 only needs to be disposed at such a position as to be vaporized by arc 23 generated by energization of arc generation mechanism 20E.

As in the first to fourth embodiments, in a case where gunpowder or other media is used for driving piston 11, the gunpowder or other media does not need to be managed so as not to explode, for example. However, in the present embodiment, it is sufficient to provide arc generation mechanism 20E that bridges terminal unit 22, and therefore, assembling work of switchgear 1E is simple.

In the present embodiment, switchgear 1E that performs the closing operation has been described with reference to FIG. 10, but an opposite driving direction may be used for a switchgear that requires a high-speed opening operation.

Sixth Embodiment

Figure 11:
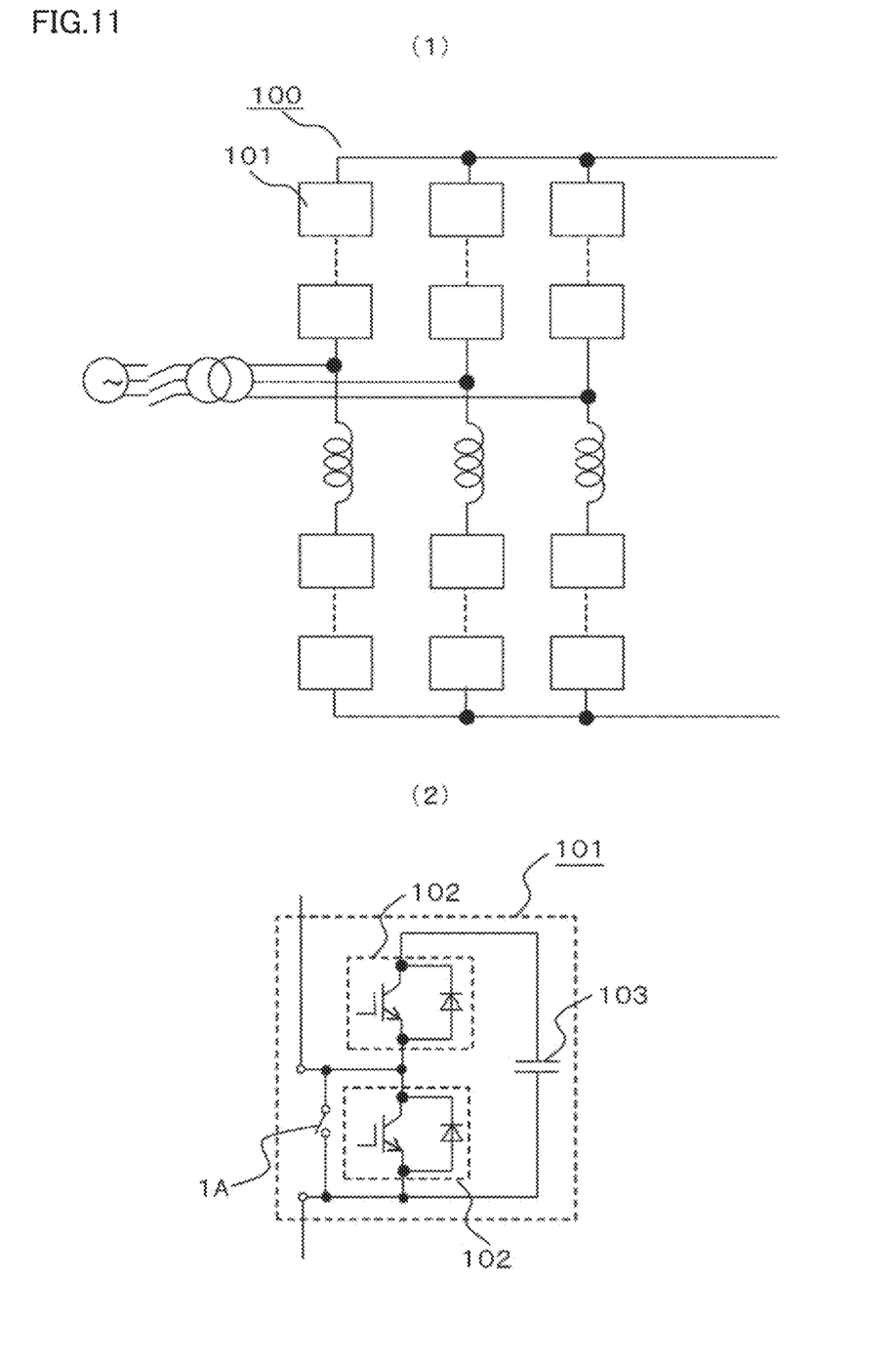
FIG. 11 is a configuration diagram of a power converter according to a sixth embodiment.

FIG. 11 is a configuration diagram of power converter 100 according to a sixth embodiment. Power converter 100 illustrated in FIG. 11 is a power converter of a modular multilevel converter (MMC) type that converts AC power into DC power. FIG. 11(1) is an overall configuration diagram of power converter 100, and FIG. 11(2) is an example of a configuration diagram of a power module 101.

As illustrated in FIG. 11(1), in power converter 100 according to the present embodiment, a plurality of power modules 101 are connected in series between each phase and a DC output line for an input system of three-phase AC power.

As illustrated in FIG. 11(2), in each of the plurality of power modules 101, two power semiconductor circuits 102 are connected in series, and a capacitor 103 is connected as an energy accumulator in parallel with two power semiconductor circuits 102 connected in series. Further, switchgear 1A according to the first embodiment is connected in parallel between an input terminal and an output terminal of each power module 101.

Since power converter 100 according to the present embodiment includes switchgear 1A, when power module 101 fails, switchgear 1A is closed to short-circuit input and output of failed power module 101 to prevent power converter 100 as a whole from stopping operating.

Even when the output of failed power module 101 is short-circuited, power converter 100 can be continuously operated by providing redundancy to the number of power modules connected in series.

When a short-circuit failure occurs in a semiconductor element in power module 101, there is a possibility that the element is broken with an arc. Therefore, in some cases, an explosion-proof structure may be provided around a power semiconductor. Since by closing switchgear 1A at a high speed when an arc is generated, switchgear 1A can shorten generation time of the arc, the explosion-proof structure of power module 101 power converter 100 can be simplified.

The switchgear illustrated in the second to fifth embodiments may be applied to switchgear 1A according to the present embodiment.

When the number of power modules 101 becomes large, the cost of component replacement increases. However, the switchgear described in the first to sixth embodiments eliminates the need for replacing the components, and an inexpensive power converter can be provided by a simple explosion-proof structure.

Since the switchgear described in the second to fifth embodiments can be operated a plurality of times, the operation can be checked, and a more reliable power converter can be provided.

REFERENCE SIGNS LIST 1A, 1B, 1C, 1D, 1E: switchgear, 2: fixed electrode, 3: movable electrode, 4: movable shaft, 5: vacuum container, 6: upper terminal, 7: lower terminal, 10A, 10B, 10C, 10D, 10E: drive unit, 11: piston, 12: container, 13: opening spring, 20A, 20B, 20C, 20D, 20E: arc generation mechanism, 20B1: fixed conductor, 20B2: movable conductor, 20B3: contact, 22: terminal unit, 23: arc, 30: drive power supply, 50: ablation material, 100: power converter, 101: power module, 102: power semiconductor circuit, 103: capacitor

The invention claimed is:

1. A switchgear comprising:
a fixed electrode;
a movable electrode provided to face the fixed electrode, the movable electrode being contactable with and separable from the fixed electrode;
a piston provided opposite to the fixed electrode to drive the movable electrode via a movable shaft connected to the movable electrode;
a container to accommodate the piston; and
an arc generation mechanism including metal and provided in the container at a position opposite to the fixed electrode, the arc generation mechanism bridging a terminal connected to an external power supply to form a circuit, and the arc generation mechanism opening the circuit with the terminal and the external power supply when energized to generate an arc at an opened portion of the circuit.

2. The switchgear according to claim 1, wherein the arc generation mechanism is a fuse.

3. The switchgear according to claim 1, wherein the arc generation mechanism is a switch including a fixed conductor connected to the terminal and a movable conductor contactable with and separable from the fixed conductor.

4. The switchgear according to claim 1, wherein the arc generation mechanism is a conductor provided on a pressure receiving surface that is a surface facing the terminal in the piston.

5. The switchgear according to claim 4, wherein
the conductor of the arc generation mechanism is divided into a plurality of conductors and provided in the piston and the container, and
of the plurality of conductors, the conductor in the piston and the conductor in the container are provided in contact with each other to be connected in series.

6. The switchgear according to claim 1, comprising an ablation material at a position to be vaporized by the arc.

7. A power converter comprising:
a power module including a power semiconductor circuit connected in series and an energy accumulator connected in parallel to the power semiconductor circuit; and
the switchgear according to claim 1, the switchgear being connected between an input terminal and an output terminal of the power module.

8. The switchgear according to claim 1, wherein the piston is configured drive the movable electrode along a piston axis passing through a center of the piston, and the piston axis intersects with the fixed electrode.

9. The switchgear according to claim 1, wherein the opening of the circuit with the terminal causes the movable electrode to move into contact with the fixed electrode.

10. The switchgear according to claim 1, wherein the arc generates pressure to move the piston.

11. The switchgear according to claim 1, wherein the switchgear does not include gunpowder.

* * * * *